(12) United States Patent
Sampson et al.

(10) Patent No.: US 6,364,165 B2
(45) Date of Patent: Apr. 2, 2002

(54) TOOTHPASTE DISPENSING SYSTEM

(76) Inventors: Wayne R. Sampson, 401 NW. 134 Ave. #108, Pembroke Pines, FL (US) 33028; Andreas Haase, 7131 NW. 105 La., Plantation, FL (US) 33317

( * ) Notice: Subject to any disclaimer, the term of this patent is extended or adjusted under 35 U.S.C. 154(b) by 0 days.

(21) Appl. No.: 09/845,094

(22) Filed: Apr. 27, 2001

Related U.S. Application Data

(63) Continuation-in-part of application No. 09/488,209, filed on Jan. 19, 2000, now abandoned.
(60) Provisional application No. 60/116,407, filed on Jan. 19, 1999.

(51) Int. Cl.[7] .............................................. B65D 35/00
(52) U.S. Cl. ......................... 222/102; 222/94; 222/96; 222/181.1
(58) Field of Search ............................ 222/94, 96, 98, 222/101, 102, 181.1, 181.3

(56) References Cited

U.S. PATENT DOCUMENTS

| | | | | |
|---|---|---|---|---|
| 2,570,755 A | * | 10/1951 | Booth | 222/96 |
| 2,848,141 A | * | 8/1958 | Intagliata | 222/101 |
| 3,263,862 A | * | 8/1966 | Tazzeo | 222/101 |
| 3,501,054 A | * | 3/1970 | Maurice | 222/102 |
| 4,508,242 A | * | 4/1985 | Wolfe | 222/102 |
| 5,215,218 A | * | 6/1993 | Choi | 222/96 |

* cited by examiner

*Primary Examiner*—J. Casimer Jacyna
(74) *Attorney, Agent, or Firm*—Kelly Bauersfeld Lowry & Kelley, LLP

(57) ABSTRACT

A system for selectively dispensing toothpaste from a flexible toothpaste tube includes a flexible boot having a flexible tube-receiving cavity and a boot nozzle with which an outlet of the toothpaste tube aligns. Pins are insertable into sleeves of the flexible boot and movable between open and closed positions for removal and insertion of the toothpaste tube. A presser engages the outer surface of the boot to selectively squeeze toothpaste from the toothpaste tube through the boot nozzle. A controller intermittently activates a driver which moves the presser along a track towards the boot nozzle to dispense a measured amount of toothpaste. Jaws are positioned adjacent to the boot nozzle for selectively opening and closing the boot nozzle. A timer and an adjustable volume dispensing dial control the amount of toothpaste dispensed.

29 Claims, 6 Drawing Sheets

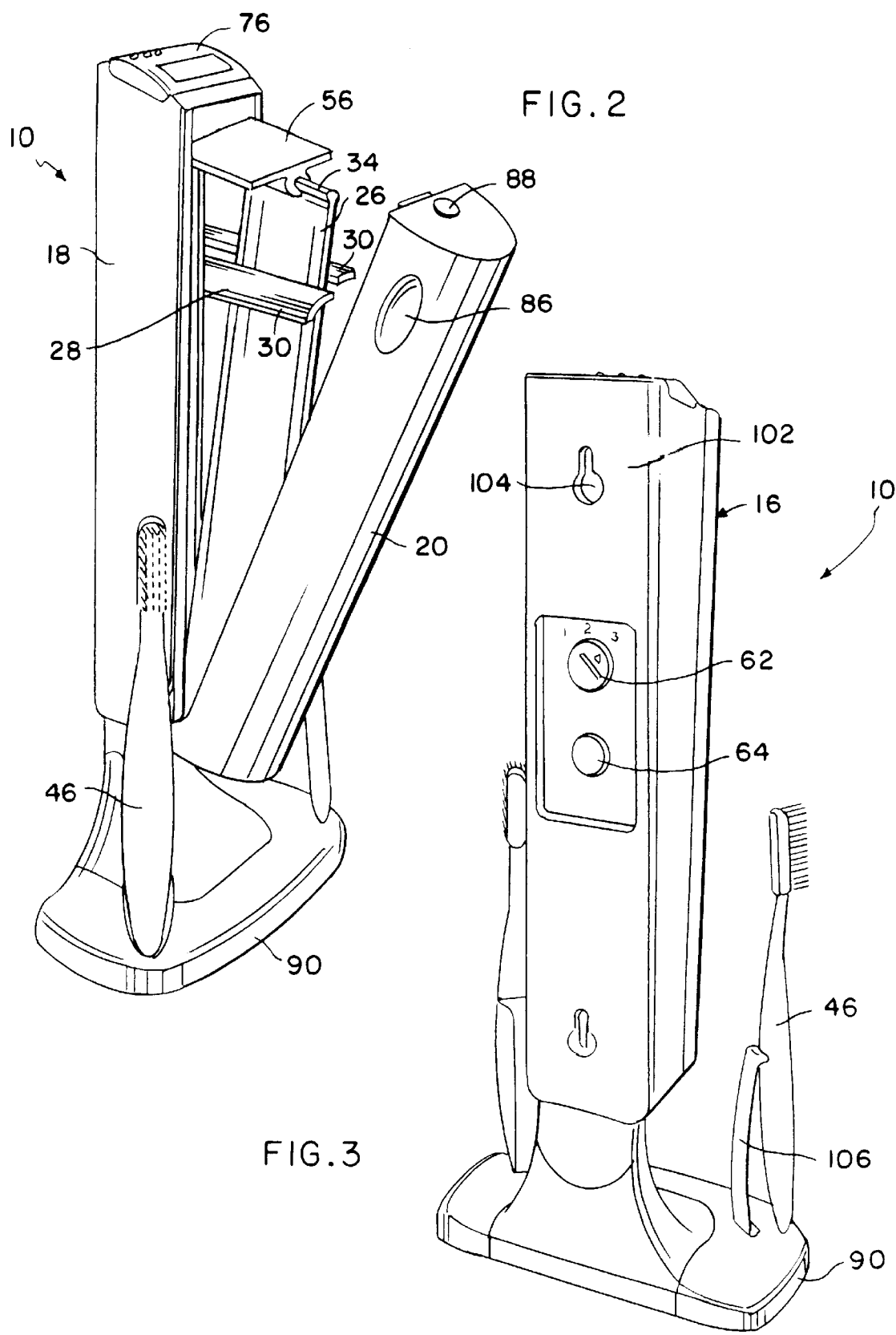

TOOTHPASTE DISPENSING SYSTEM

RELATED APPLICATION

This application is a continuation-in-part of U.S. application Ser. No. 09/488,209, filed Jan. 19, 2000, now abandoned which claims priority from provisional application Ser. No. 60/116,407 filed Jan. 19, 1999.

BACKGROUND OF THE INVENTION

The present invention relates to toothpaste dispensing systems. More particularly, the present invention relates to a toothpaste dispensing system which automatically dispenses a controlled and predetermined amount of toothpaste onto a toothbrush without the need for manual manipulation of either the dispenser or the tube of toothpaste.

It is very common to find unsightly partially-squeezed tubes of toothpaste in bathrooms. Oftentimes, these partially-squeezed tubes are found on the bathroom counter, giving the bathroom a cluttered or messy appearance. Another concern with hand-squeezed toothpaste tubes is that the amount of toothpaste administered at each brushing is inconsistent. At times too much toothpaste is squeezed from the tube and administered to the toothbrush. At other times, and particularly with children, too little toothpaste is administered to the toothbrush. Furthermore, the time actually spent brushing varies from brushing to brushing and may often be less than the dentist-recommended time.

Another problem with toothpaste tubes is that as they are emptied, it becomes increasingly difficult to dispense toothpaste and oftentimes the tube is discarded before all of the toothpaste is used. Both the over-administration of toothpaste and the difficulty of emptying the tube of toothpaste results in toothpaste being wasted.

It is also common that the toothpaste tube is shared by more than one member of a family. In the event that a toothpaste tube is shared by more than one person, hygiene considerations take effect as the toothpaste tube can spread germs from sick family members. Some people consider toiletry items, such as toothpaste tubes and toothbrushes, personal and instead of sharing a single toothpaste tube, several toothpaste tubes for each member of the family may necessarily be stored in the bathroom creating additional clutter and storage problems.

Accordingly, there is a need for a toothpaste dispensing system which is capable of efficiently utilizing the toothpaste in the tube, preventing waste, and consistently administering toothpaste from brushing to brushing. What is also needed is a toothpaste system which is able to indicate the correct brushing time. What is further needed is a toothpaste dispensing system which requires minimal physical handling. Such a toothpaste dispensing system should be aesthetically pleasing and practical in use. The present invention fulfills these needs and provides other related advantages.

SUMMARY OF THE INVENTION

The present invention resides in a system for selectively dispensing toothpaste from a flexible toothpaste tube. The system generally comprises a flexible boot having a flexible tube-receiving cavity and a boot nozzle at one end with which an outlet of the flexible tube is aligned. A presser engages the outer surface of the boot to selectively squeeze toothpaste from the flexible tube and through the boot nozzle. A driver selectively positions the presser along a track associated with the boot, and a controller intermittently activates the driver to move the presser along the length of the boot towards the boot nozzle to dispense a measured amount of toothpaste therefrom.

Pins are insertable into sleeves of the flexible boot and movable between closed and open positions to selectively close a tube passageway to the cavity of the boot during operation, and open the tube passageway for removal and insertion of the flexible tube. The pins are moved into an open position when the presser is disengaged from the boot. Typically, the presser comprises rollers which compress opposing sides of the flexible boot upon activation of the controller and driver. Jaws are positioned adjacent to the boot nozzle for selectively opening and closing the boot nozzle, preventing undesirable flow of toothpaste through the boot nozzle.

The controller typically comprises a biased shaft which is positioned below the boot nozzle. Upon being actuated, the shaft activates the driver, which in turn positions the presser along the track to dispense toothpaste from the boot nozzle. Alternatively, the controller comprises an electronic sensor linked to the driver for automatically activating the driver upon sensing an object, such as a toothbrush, placed under the boot nozzle.

A timer is activated by the controller to dispense a measured amount of toothpaste from the flexible tube. An adjustable volume dispensing dial controls the amount of toothpaste dispensed.

A presser return switch is linked to the driver for releasing the presser from the flexible boot. The return switch can be actuated manually or automatically activated when the presser reaches a predetermined point along the track.

The system is preferably housed in a cover which is releasably connected to a base which cooperatively form a flexible boot-receiving cavity therebetween.

The base of the housing may include a foot for supporting the apparatus in an upright position when placed on a horizontal surface. Alternatively, the base includes a wall fixture for supporting the apparatus on a vertical surface. The wall fixture may include an electrical plug which is electrically connected to the driver and extends from the base for insertion into an electrical wall socket. In another embodiment, the apparatus is placed flush within a wall and directly connected to electrical wiring within the wall.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2 is a front perspective view of a toothpaste dispensing system similar to FIG. 1;

FIG. 3 is a rear perspective view of the system of FIG. 2, illustrating an adjustable toothpaste dispensing dial and a reset switch;

DETAILED DESCRIPTION OF THE PREFERRED EMBODIMENTS

Figure 5:
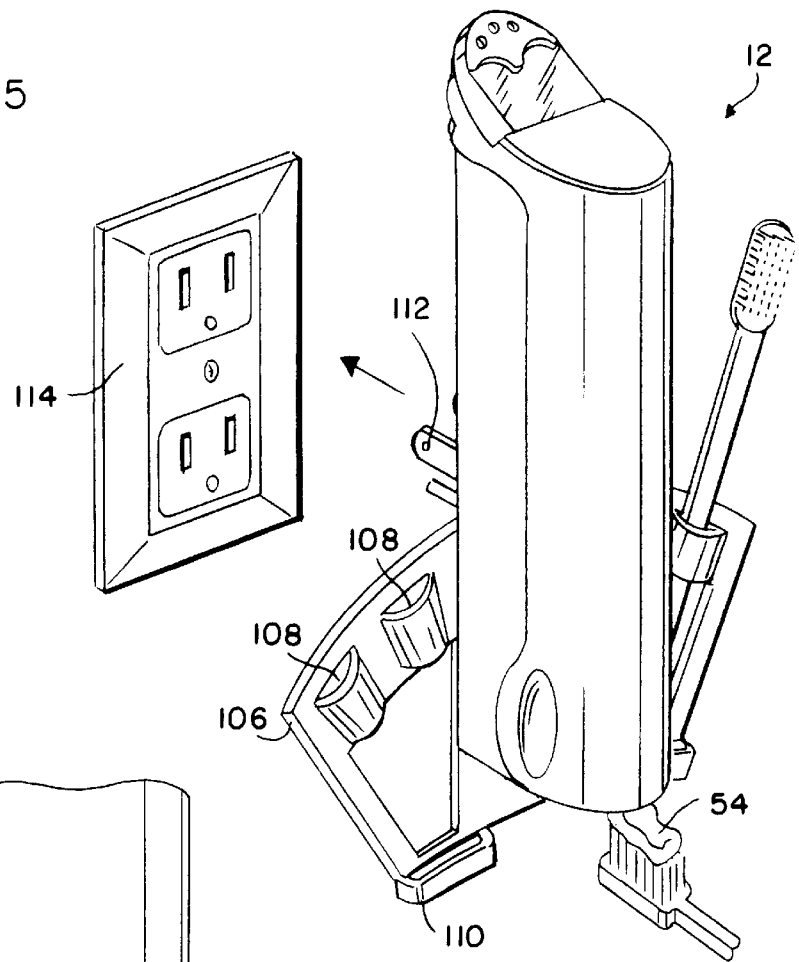
FIG. 5 is a perspective view of another toothpaste dispensing system embodying the invention, having an electrical plug for insertion into a wall outlet.
Figure 6:
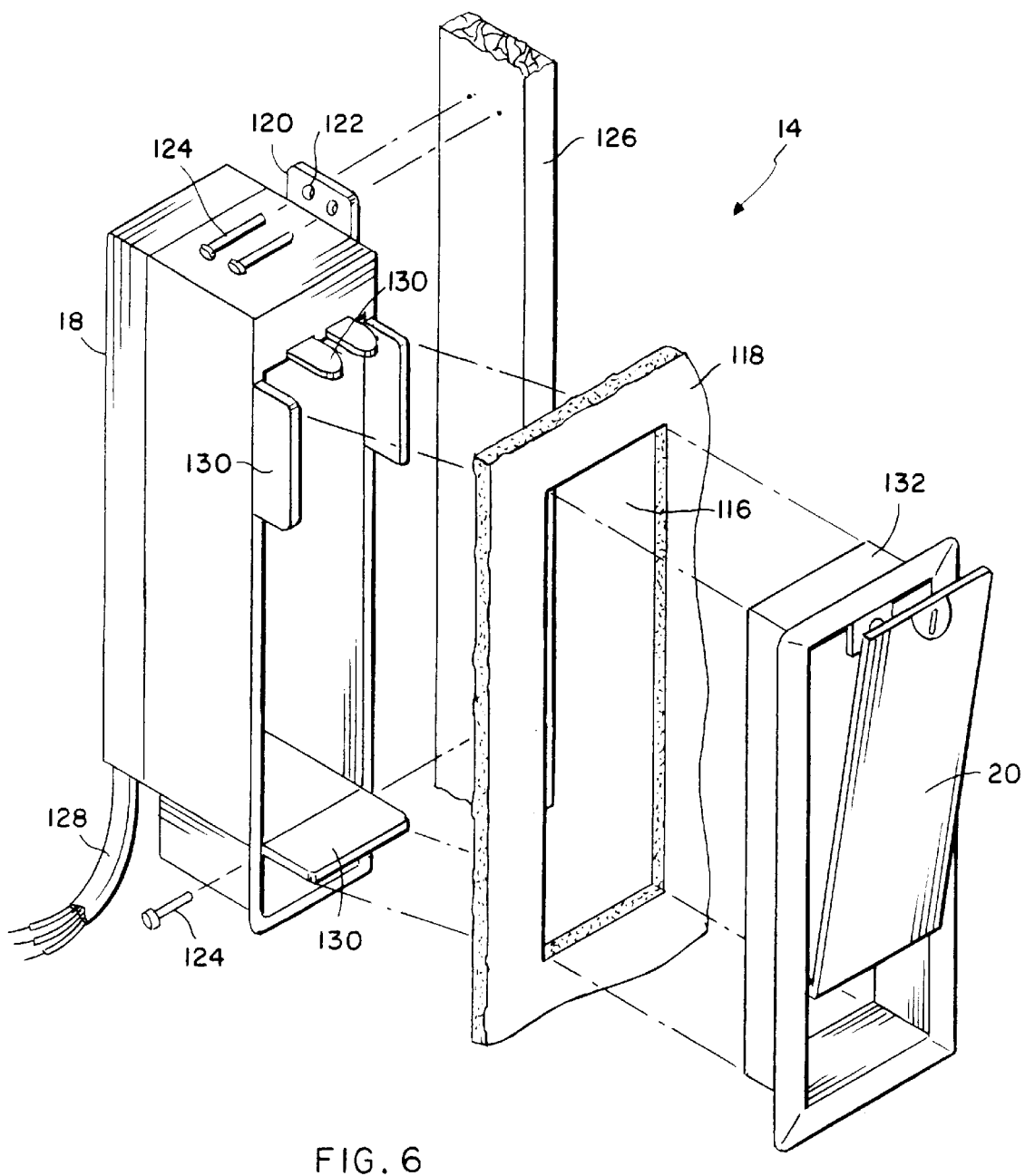
FIG. 6 is an exploded perspective view of yet another toothpaste dispensing system embodying the invention, which is directly wired into electrical wiring within a wall.
Figure 7:
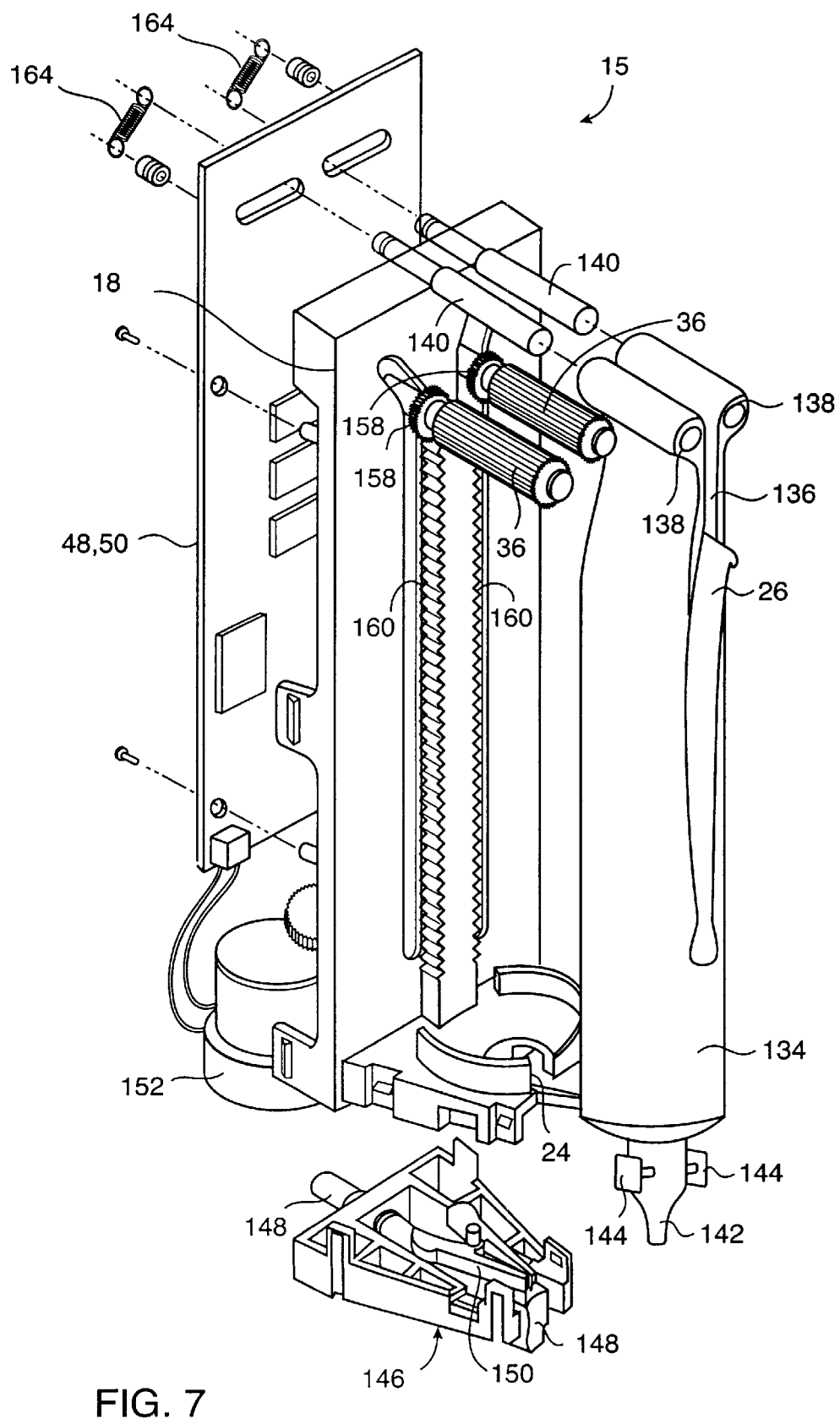
FIG. 7 is a partly exploded perspective view of yet another toothpaste dispensing system embodying the present invention.
Figure 8:
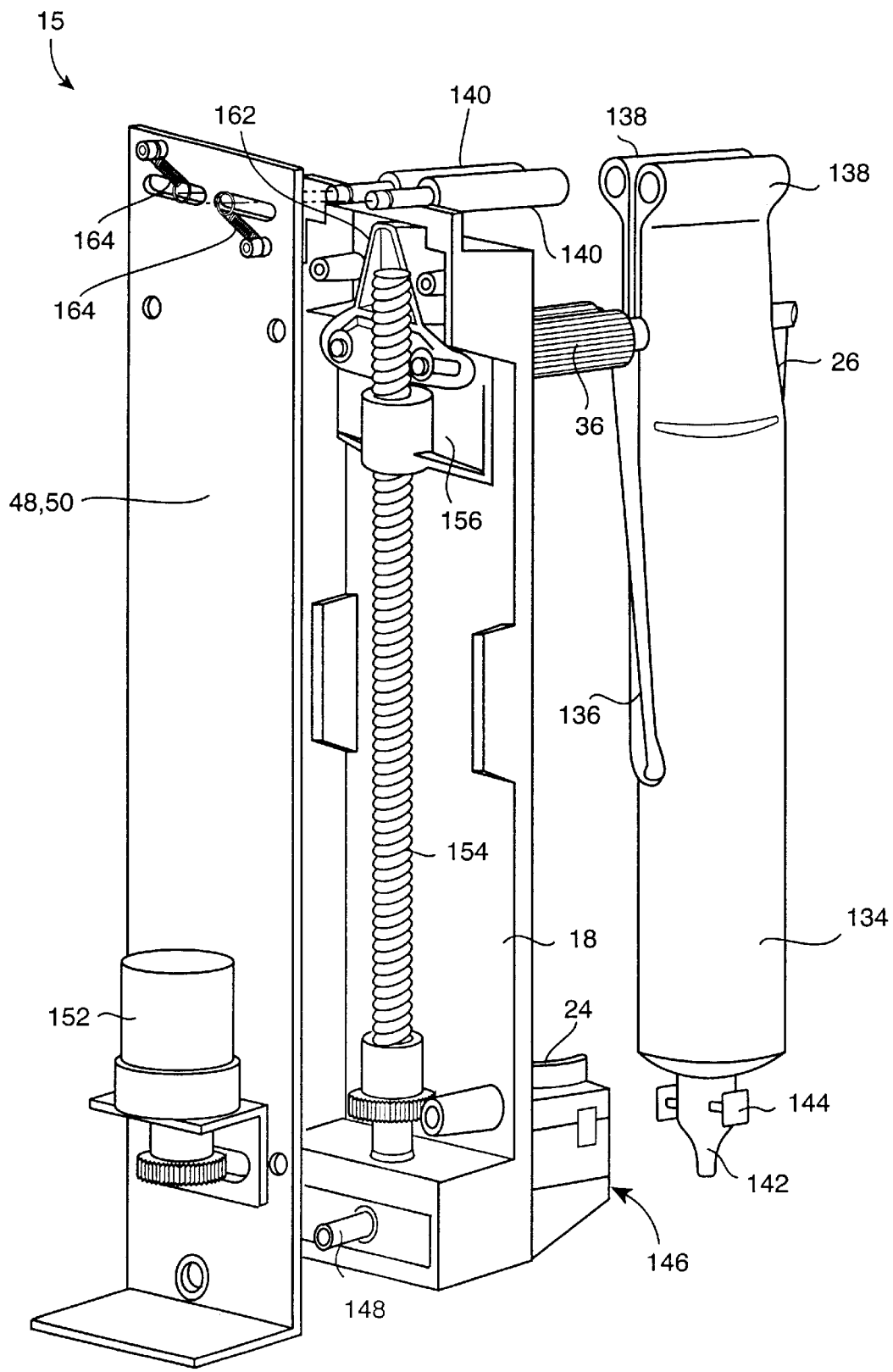
FIG. 8 is a partly exploded rear perspective view of the toothpaste dispensing system of FIG. 7.

As shown in the drawings for purposes of illustration, the present invention is concerned with a toothpaste dispensing system, generally referred to in FIGS. 1–4 by the reference number 10, in FIG. 5 by the reference number 12, in FIG. 6 by the reference number 14, and in FIGS. 7 and 8 by the reference number 15. In each of the illustrated embodiments, functionally equivalent components are given the same reference number.

Figure 1:
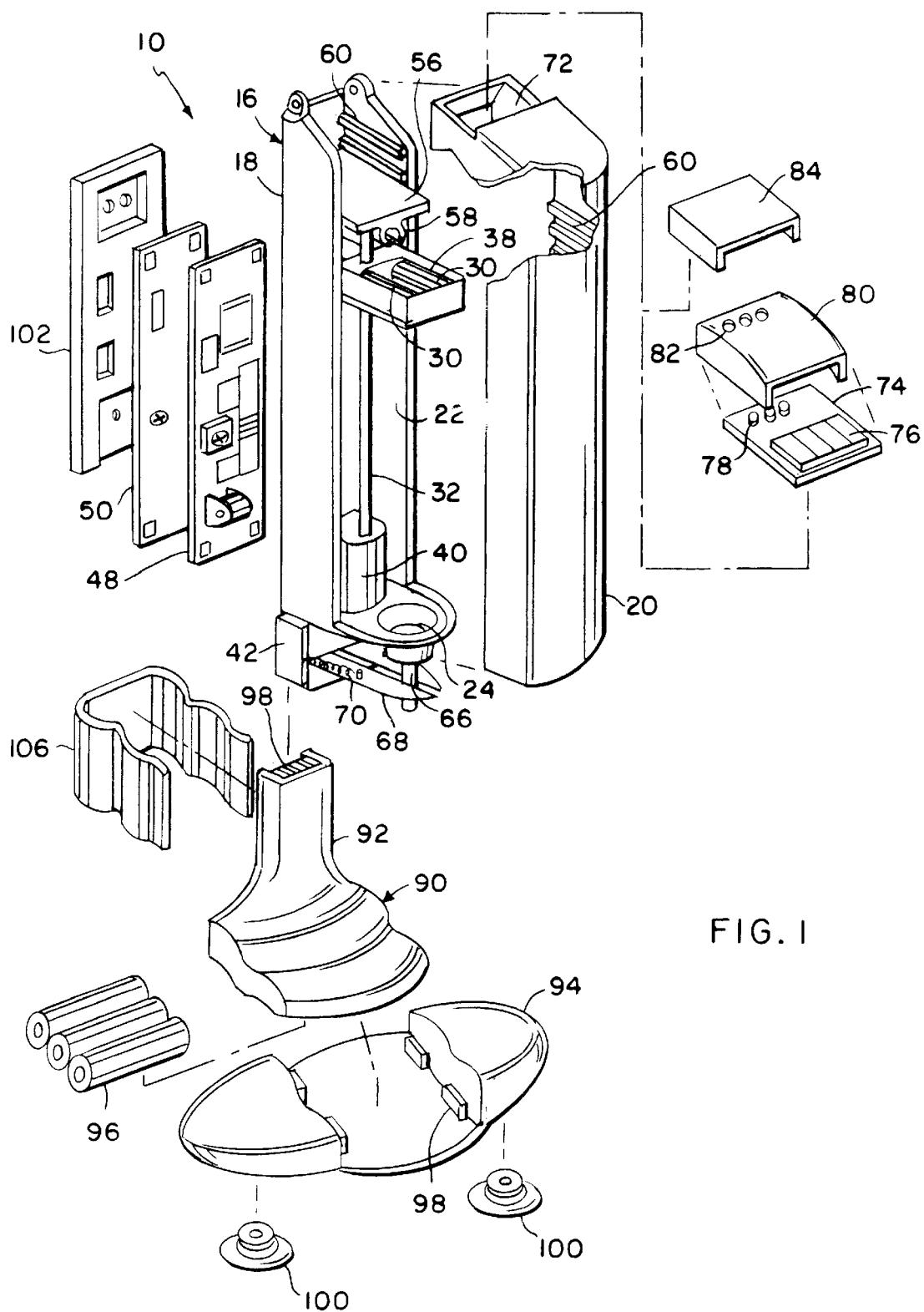
FIG. 1 is an exploded perspective view of components comprising a toothpaste dispensing system embodying the present invention.

With reference to FIGS. 1 and 2, the toothpaste dispensing system 10 is generally comprised of a housing 16 having base 18 and a cover 20 connected to the base 18 to form a toothpaste tube-accepting cavity 22 therebetween. The base 18 includes a dispensing orifice 24 which conforms to and supports the outlet of a toothpaste tube 26. As can be seen from the drawings, the base 18 is configured to at least partially surround the tube of toothpaste 26. The cover 20 is removably, and preferably hingedly, connected to the base 18 and when closed fully encapsulates the toothpaste tube 26 within the cavity 22 of the housing 16.

A presser 28 having two parallel members 30 is movably disposed on a track 32 which extends approximately the length of the base 18. Initially, the parallel members 30 of the presser 28 are disposed on either side of a closed and flattened end 34 of the toothpaste tube 26 opposite the outlet. The parallel members 30 of the presser 28 compress the sides of the toothpaste tube 26 together as it moves downward, forcing toothpaste out of the outlet of the toothpaste tube 26 and through the orifice 24. Preferably, the presser 28 comprises two parallel rollers 36 having extending radial teeth 38 which interfit with one another as the presser 28 is moved along the track 32, as illustrated in FIG. 1.

The presser 28 is positioned along the track 32 by a driver 40 having a motor 42. The driver 40 and motor 42 are activated by a controller 44 which senses the placement of a toothbrush 46 under the housing 16. The controller 44 includes circuitry on a circuit board 48 built into or insertable into the base 18 of the housing 10. A cover plate 50 lies over the circuit board 48 and flush with the base 18 to conceal and protect the circuit board 48. Although the controller 44 can be a lever or the like, preferably it is comprised of an electronic sensor 52, illustrated in FIG. 4, which emits an electromagnetic path towards the orifice 24. When the electromagnetic path is broken by the toothbrush 46, toothpaste 54 is dispensed onto the toothbrush 46, as illustrated in FIG. 5. An internal timer of the circuitry 48 controls the length of time the driver 40 is activated, and thus the distance the presser 28 moves, in order to dispense a predetermined and reproducible amount of toothpaste 54.

Additional features which enhance the operation of the system 10 include a platform 56 having a clip 58, illustrated in FIGS. 1 and 2, which attaches to the closed end 34 of the toothpaste tube 26 to hold the toothpaste tube 26 in place while the presser 28 moves downwardly and forces toothpaste 54 out of the toothpaste tube 26. Shelves 60 are formed in the base 18 and cover 20 to adjust the height of the platform 56 within the housing 16 to accommodate different sized toothpaste tubes 26.

Referring to FIG. 3, a volume control dial 62 can be adjusted to alter the amount of toothpaste 54 dispensed when the system 10 is activated. For example, when the volume dispensing dial 56 is placed in a first position enough toothpaste is dispensed for a child and when the dial 56 is placed in a second or third position a greater amount of toothpaste is dispensed for an adult. When the nearly all of the toothpaste 54 has been dispensed from the toothpaste tube 26 and the presser 28 reaches a predetermined point near the dispensing orifice 24 of the base 18, the presser 28 is automatically returned to its either its starting position or a predetermined position near the top of the track 32. A manual presser return switch 64 is also provided and when depressed returns the presser 28 as described so that the user can easily remove partially filled toothpaste tubes 26.

Referring again to FIG. 1, although not a concern for most toothpaste brands, it has been found that at least one brand of toothpaste will gravitationally flow out from the toothpaste tube 26 and orifice 24 even when the presser 28 is not activated. To resolve this problem a flexible conduit 66 extends from the dispensing orifice 24. A pair of jaws 68 are disposed adjacent to and on either side of the conduit 66 and selectively open when the system 10 is activated to allow toothpaste 54 to flow through the conduit 66, and close off the conduit 66 in a pinching action when the system 10 is not activated to prevent toothpaste 54 from inadvertently flowing through the conduit 66. The mechanism which controls the opening and closing of the jaws 68 is linked to the motor 42 so that when the motor 42 is activating the driver 40 the jaws 68 are open, and when the motor 42 stops the jaws 68 close. Springs 70 are used to bias the jaws 68 in an open position when the motor 42 is running.

The cover 20 has cut-out portion 72 into which is inserted a preferably digital alarm clock 74 which includes an LCD display 76, reset and control buttons 78, and a translucent cover 80 having apertures 82 through which the buttons 78 extend The clock 74 preferably also includes a timer which alarms when dentist-recommended brushing time has elapsed. The timer can be set by one of the control buttons 78, or automatically set when a toothbrush 46 activates the system 10. In simpler models of the system 10, a decorative plate 84 is inserted into the cover cut-out 72. The cover 20 also includes indentations 86 which act as finger-holds to facilitate unhinging of the cover 20 from the base 18. The cover 20 may be latched to the base 18, in which case a latch-release button 88 is provided through the cover 20.

The system 10 further includes a foot 90 attachable to the base 18 for supporting the system 10 on a horizontal surface, such as the top of a counter. The foot 90 separates into an upper vertical portion 92 and a lower horizontal portion 94 into which batteries 96 are inserted. The foot 90 includes electrodes 98 which contact the batteries 96 and transfer power to the motor 42 and circuitry 48. Foot stabilizers 100, usually in the form of suction cups, prevent the system 10 from sliding or falling over on the counter.

Figure 4:
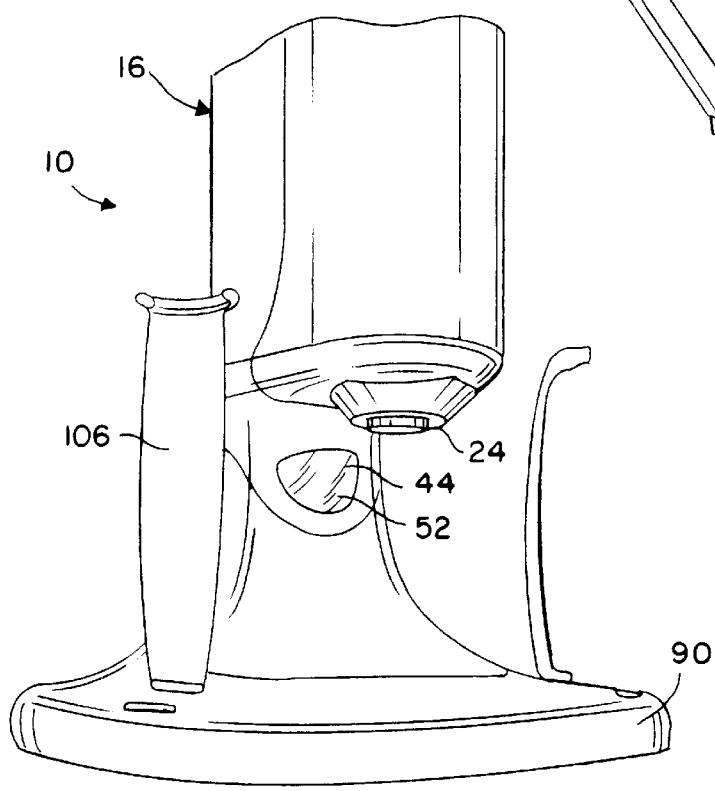
FIG. 4 is a fragmented perspective view of the system of FIG. 2, illustrating an electronic sensor positioned near a dispensing orifice of the system.

A wall mount 102 is attachable to the rear of the base 18 for supporting the system 10 on a vertical surface, such as a wall. As illustrated in FIG. 3, the wall mount 102 includes recesses 104 which rest upon vertical supports, such as nails, which extend from the wall. Either the foot 90 or the wall mount 102 may include a toothbrush holder 106 for conveniently storing toothbrushes 46 in an aesthetically pleasing manner near the dispensing system 10. As can be seen in the drawings, the toothbrush holder 106 can take many forms. For example, in FIG. 1, the toothbrush holder 106 clips onto the vertical portion of the foot 92. In FIGS. 2–4, the toothbrush holders 106 extend upwardly from the lower portion of the foot 94. In FIG. 5, the toothbrush holder 106 is attached to or formed with the base 18 and is fan-shaped, having guides 108 and resting ledges 110 which support the inserted toothbrushes 46.

A second embodiment is illustrated in FIG. 5 and generally includes the same features and components as system 10 of FIGS. 1–4, except that instead of using batteries 96 as a power source, the system 12 utilizes an electrical plug 112 extending from the base 18 for electrical connection by insertion into a wall socket 114. The electrical plug 114 is electrically connected to the electronic circuitry 48 and motor 42 of the controller 44 and driver 40. The electrical plug 112, when inserted into the wall socket 114, also acts to vertically support the system 12 on the wall.

A third embodiment of the invention is illustrated in FIG. 6. An aperture 116 sized to allow passage of the modified base 18 is cut into a wall 118. The base 18 includes tabs 120 having apertures 122 through which screws 124 or the like can be inserted and driven into an internal support structure 126, such as an internal beam or two-by-four, for secure attachment. Electrical leads 128 extend from the base 18 for connection to the internal wiring of the wall 118. The base 18 also includes projections 130 which frictionally fit over a surrounding molding 132 of the modified cover 20. The molding 132 extends into the wall 118 and lies flush with the wall 118 to conceal the wall aperture 116 and give the system 14 an aesthetically pleasing look. Although not illustrated, the system 14 contains the same essential components (such as the presser 28, track 32, driver 40, controller 44 etc.) as the previously described systems 10 and 12 and operates in the same manner. Although this system 14 is more difficult to install, use of this system 14 is advantageous as there is no need for the user to replace batteries 96 and the system 14 does not occupy counter space nor does it protrude from the wall 118.

With reference now to FIGS. 7 and 8, a particularly preferred system 15 embodying the present invention is illustrated. It has been found with prior art toothpaste dispensing systems, and to a certain degree in the previously described systems 10–14 of the present invention, that the toothpaste tube 26 begins to collapse upon itself and lose structural integrity when one-third to one half of the toothpaste in the toothpaste tube 26 has been dispensed. This collapsing action can interfere with the pressers 28 and disrupt the operation of the system 10–14. Accordingly, there has been devised a flexible boot 134 for use in this system 15. The boot 134 is comprised of a flexible material, such as silicone, which can be compressed by the rollers 36 to dispense toothpaste from the toothpaste tube 26 residing within the boot 134 in a controlled manner while preventing the collapse of the toothpaste tube 26. The flexible boot 134 defines a flexible toothpaste tube-receiving cavity into which the toothpaste tube 26 is inserted. Preferably, the flexible boot 134 includes a slit 136 or other passageway extending through an end of the flexible boot 134 to facilitate the insertion and removal of the toothpaste tube 26. Sleeves 138 are formed in the flexible boot 134 at one end which are configured so as to receive pins 140 associated with the base 18. The pins 140 hold the flexible boot 134 in place and serve to open and close the slit 136 as will be described more fully herein. Preferably, the slit 136 includes a rounded cut-out portion 142 which acts as a tear resistant feature of the slit 136.

A nozzle 142 is formed at an end of the flexible boot 134 generally opposite the sleeves 138. The orifice 24 of the base 18 is configured so as to accept the nozzle 142 therethrough. The nozzle 142 preferably includes protruding retainers 144 which are insertable between the base 18 and a controller assembly 146 to further secure and hold in place the flexible boot 134.

The controller assembly 146 includes a controller in the form of a guide shaft 148 which is biased with a spring or the like in a forward or off position. Due to the gravitational flow of toothpaste problem experienced with certain brands of toothpaste, as described above, the controller assembly 146 includes a pair of jaws 150 which are biased in the closed position so as to crimp upon and close the nozzle 142 during non-operation of the system 15, but are movable into the open position when guide shaft 148 is actuated, such as by pressing a toothbrush 46 into contact with the guide shaft 148. The controller assembly 146 is attached to the bottom of the base 18 so that the guide shaft 148 underlies nozzle 142. In this fashion, when a toothbrush 46 is engaged with the guide shaft 148 to activate the driver 152, the bristles of the toothbrush 46 are positioned directly underneath nozzle 142.

Upon being actuated, the guide shaft 148 activates the driver 152 which in turn causes a worm gear 154 to rotate in the desired direction. The rollers 36 are attached to a roller retainer plate 156 movably attached to the worm gear 154 on the back side of the base 18. The rollers 36 include guide gears 158 which engage a track 160 to maintain constant pressure and alignment of the rollers 36 over the boot 134. As a roller retainer plate 156 moves downwardly on the worm gear 154, the rollers 36 compress opposing sides of the flexible boot 134, as well as the contents of the toothpaste tube 26, to cause toothpaste to exit through the nozzle 142. The amount of toothpaste delivered may be controlled by pre-setting the volume control dial 62, or by using a timer as disclosed above. Such a timer would be an integral part of the printed circuit board 48 which would disrupt power to the driver 152 after a predetermined set time period.

As the rollers 36 approach the nozzle 142 of the flexible boot 134, the roller retainer plate 156 will approach the base of the worm gear 154, and the roller gears 158 will approach the end of the guide track 160. The toothpaste tube 26 will be substantially emptied at this point, and the rollers 36 can be returned to their upmost position. Preferably, the system 15 includes a presser return switch linked to the driver 152 which returns the rollers 136 to the upmost position and releases the rollers 36 from the flexible boot 134. As can be seen in FIG. 7, the track 160 diverges at its uppermost end so that the rollers 36 are disengaged from the outer surface of boot 134. As this occurs, a wedge-shaped portion 162 of the retainer plate 156 comes into contact with the ends of the pins 140 protruding through the backside of the base 18 to push the pins 140 away from one another and stretch springs 164 which serve to bias the pins 140 into a closed position. As will be appreciated by the reader, when the pins 140 are pushed away from one another, the sleeves 138 of the flexible boot 134 are also moved away from one another to open the slit 136. This facilitates the removal of the exhausted toothpaste tube 26 and the insertion of a new toothpaste tube into the cavity of the flexible boot 134.

The system 15 as illustrated in FIGS. 7 and 8 can include the cover 20, foot 90 for supporting the system in an upright position when placed on a horizontal surface, a wall mount fixture 102 for supporting the system 15 on a vertical surface, or it may even be incorporated into the internal wall system 14 as illustrated in FIG. 6. In any event, the use of the flexible boot 134 allows any size toothpaste tube 26 to be inserted therein and dispensed of toothpaste without collapse or crimping of the toothpaste tube 26.

In use, batteries 96 are inserted into the foot 90 of the system 10, the system 12 is plugged into a wall socket 114, or the system 14 is installed onto the wall 18 in order to provide power to the system. A volume dispensing dial 62 is adjusted so that the systems 10–15 will administer the desired amount of toothpaste 54. The cover 20 is opened and a toothpaste tube 26 is inserted into the base with the open outlet resting in the orifice 24 and the closed end 34 inserted between the presser 28 and into the clip 58 of the adjusted platform 56, or into the flexible boot 134. When a toothbrush 46 is placed under the orifice 24, the controller 44 or 148 activates the motor 42 and driver 40 or 152 to move the presser 28 a predetermined distance down the track 32 or 160. In the event the timer of the alarm clock 74 is set, the timer alarms when the dentist-recommended brushing time has expired.

As can be appreciated by the reader, with the exception of inserting the toothpaste tube 26 into the housing cavity 22, there is no need to touch the systems 10–15 for the dispensing of toothpaste 54. The systems 10–15 accurately dispense approximately the same amount of toothpaste 54 every time the systems 10–15 are activated.

Although several embodiments have been described in detail for purposes of illustration, various modifications of each may be made without departing from the scope and spirit of the invention. Accordingly, the invention is not to be limited, except as by the appended claims.

What is claimed is:

1. A system for dispensing toothpaste from a flexible tube having an outlet at one end, the system comprising:
   a flexible boot including a flexible tube-receiving cavity and a boot nozzle with which the flexible tube outlet aligns;
   a presser for engaging the outer surface of the boot to selectively squeeze toothpaste from the flexible tube through the boot nozzle;
   a driver for selectively positioning the presser along a track associated with the boot; and
   a controller for intermittently activating the driver to move the presser along the length of the boot towards the boot nozzle to dispense a measured amount of toothpaste from the boot nozzle.

2. The system of claim 1, including jaws positioned adjacent to the boot nozzle for selectively opening and closing the boot nozzle.

3. The system of claim 1, wherein the controller comprises a biased shaft positioned below the boot nozzle which, upon being actuated, activates the driver.

4. The system of claim 1, wherein the controller comprises an electronic sensor linked to the driver for automatically activating the driver upon sensing an object placed under the boot nozzle.

5. The system of claim 1, including a timer associated with the driver and activated by the controller.

6. The system of claim 5, wherein the presser return switch is automatically activated when the presser reaches a predetermined point along the track.

7. The system of claim 1, including a presser return switch linked to the driver which releases the presser from the flexible boot.

8. The system of claim 1, including an adjustable volume dispensing dial linked to the driver.

9. The system of claim 1, wherein the presser comprises rollers which compress opposing sides of the flexible boot upon activation.

10. The system of claim 1, including pins associated with the base which are insertable into sleeves of the flexible boot and movable between closed and open positions to selectively close a tube passageway to the cavity of the boot during operation, and open the tube passageway for removal and insertion of the flexible tube.

11. The system of claim 10, wherein the pins are moved into an open position when the presser is disengaged from the boot.

12. The system of claim 1, including a cover releasably connected to a base which cooperatively form a flexible boot-receiving cavity therebetween.

13. The system of claim 12, wherein the base includes a foot for supporting the system in an upright position when placed on a horizontal surface.

14. The system of claim 12, wherein the base includes a wall mount fixture for supporting the system on a vertical surface.

15. The system of claim 14, wherein the driver is directly connected to electrical wiring within the vertical surface.

16. A system for dispensing toothpaste from a flexible tube having an outlet at one end, the system comprising:
   a base;
   a flexible boot associated with the base, the boot including a flexible tube-receiving cavity and a boot nozzle with which the flexible tube outlet aligns;
   jaws positioned adjacent to the boot nozzle for selectively opening and closing the boot nozzle;
   pins associated with the base which are insertable into sleeves of the flexible boot and movable between closed and open positions to selectively close a tube passageway to the cavity of the boot during operation, and open the tube passageway for removal and insertion of the flexible tube;
   a presser comprising rollers disposed within the base for engaging the outer surface of the boot to selectively compress opposing sides of the flexible boot to squeeze toothpaste from the flexible tube through the boot nozzle;
   a cover releasably connected to the base, wherein the cover and the base cooperatively form a flexible boot-receiving cavity therebetween;
   a driver for selectively positioning the presser along a track associated with the boot; and
   a controller for intermittently activating the driver to move the presser along the length of the boot towards the boot nozzle to dispense a measured amount of toothpaste from the boot nozzle.

17. The system of claim 16, wherein the controller comprises a biased shaft positioned below the boot nozzle which, upon being actuated, activates the driver.

18. The system of claim 16, wherein the controller comprises an electronic sensor linked to the driver for automatically activating the driver upon sensing an object placed under the boot nozzle.

19. The system of claim 16, including a timer associated with the driver and activated by the controller.

20. The system of claim 16, including a presser return switch linked to the driver which releases the presser from the flexible boot, wherein the presser return switch is automatically activated when the presser reaches a predetermined point along the track.

21. The system of claim 16, including an adjustable volume dispensing dial linked to the driver.

22. The system of claim 16, wherein the pins are moved into an open position when the presser is disengaged from the boot.

23. The system of claim 16, wherein the base includes a foot for supporting the system in an upright position when placed on a horizontal surface.

24. The system of claim 16, wherein the base includes a wall mount fixture for supporting the system on a vertical surface.

25. The system of claim 24, wherein the driver is directly connected to electrical wiring within the vertical surface.

26. A system for dispensing toothpaste from a flexible tube having an outlet at one end, the system comprising:
   a base;
   a flexible boot associated with the base, the boot including a flexible tube-receiving cavity and a boot nozzle with which the flexible tube outlet aligns;
   jaws positioned adjacent to the boot nozzle for selectively opening and closing the boot nozzle;
   a presser comprising rollers disposed within the base for engaging the outer surface of the boot to selectively compress opposing sides of the flexible boot to squeeze toothpaste from the flexible tube through the boot nozzle;
   pins associated with the base which are insertable into sleeves of the flexible boot and movable between closed and open positions to selectively close a tube passageway to the cavity of the boot during operation, and open the tube passageway for removal and insertion of the flexible tube;
   a cover releasably connected to the base, wherein the cover and the base cooperatively form a flexible boot-receiving cavity therebetween;
   a driver for selectively positioning the presser along a track associated with the boot;
   a controller for intermittently activating the driver to move the presser along the length of the boot towards the boot nozzle to dispense a measured amount of toothpaste from the boot nozzle, the controller comprising a biased shaft positioned below the boot nozzle which, upon being actuated, activates the driver;
   a timer associated with the driver and activated by the controller;
   a presser return switch linked to the driver which releases the presser from the flexible boot, wherein the presser return switch is automatically activated when the presser reaches a predetermined point along the track; and
   an adjustable volume dispensing dial linked to the driver.

27. The system of claim 26, wherein the base includes a foot for supporting the system in an upright position when placed on a horizontal surface.

28. The system of claim 26, wherein the base includes a wall fixture for supporting the system on a vertical surface.

29. The system of claim 28, wherein the driver is directly connected to electrical wiring within the vertical surface.

* * * * *